(12) United States Patent
Podda et al.

(10) Patent No.: US 12,181,038 B2
(45) Date of Patent: Dec. 31, 2024

(54) AIRCRAFT CAPABLE OF HOVERING

(71) Applicant: LEONARDO S.P.A., Rome (IT)

(72) Inventors: Daniele Podda, Samarate (IT); Andrea Gabrielli, Samarate (IT); Federico Montagna, Samarate (IT); Diego Scaltritti, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/549,272

(22) PCT Filed: Mar. 1, 2022

(86) PCT No.: PCT/IB2022/051804
§ 371 (c)(1),
(2) Date: Sep. 6, 2023

(87) PCT Pub. No.: WO2022/189898
PCT Pub. Date: Sep. 15, 2022

(65) Prior Publication Data
US 2024/0167561 A1 May 23, 2024

(30) Foreign Application Priority Data
Mar. 11, 2021 (EP) .................................... 21162130

(51) Int. Cl.
*F16H 57/08* (2006.01)
*B64D 35/02* (2024.01)

(52) U.S. Cl.
CPC ........... *F16H 57/082* (2013.01); *B64D 35/02* (2013.01); *F16H 2200/2007* (2013.01)

(58) Field of Classification Search
CPC ............. F16H 57/082; F16H 2057/085; F16H 1/2836; F16H 1/2809
See application file for complete search history.

(56) References Cited

U.S. PATENT DOCUMENTS 3,227,066 A 1/1966 Bowen, Jr.
5,466,198 A * 11/1995 McKibbin ................. F02C 7/36
475/346

(Continued)

FOREIGN PATENT DOCUMENTS

CA 3044130 11/2019
EP 1464869 A1 * 10/2004 ........... F16H 1/2827

OTHER PUBLICATIONS

International Search Report and Written Opinion in corresponding International Patent Application No. PCT/IB2022/051804, mailed May 9, 2022 (13 pages).

*Primary Examiner* — Stacey A Fluhart
*Assistant Examiner* — Aimee Tran Nguyen
(74) *Attorney, Agent, or Firm* — Leason Ellis LLP

(57) ABSTRACT

An aircraft capable of hovering is described, comprising a motor member; a rotor connected to the motor member; a transmission shaft rotatable around a first axis and adapted to drive the rotor; and a transmission interposed between the motor member and the rotor and comprising a planetary gear formed by a sun rotatable around a second axis; a crown that is angularly fixed; and two satellites meshing, each, with the crown and the sun, and rotatable around respective third axes, which are, in turn, rotatable around the second axis; and a satellite carrier rotatable around the second axis and comprising two first pins with respect to which the satellites are rotatable around the respective third axes; the transmission comprises an interface, angularly integral with the satellite carrier around the second axis and said transmission shaft around the first axis; the interface being coupled to said satellite carriers and the transmission shaft so as to allow an angular misalignment between the second axis and a portion of the interface.

11 Claims, 7 Drawing Sheets

(56) References Cited

U.S. PATENT DOCUMENTS

| | | |
|---|---|---|
| 2009/0111639 A1 | 4/2009 | Klingels |
| 2017/0108113 A1* | 4/2017 | Hasting .................. F16H 57/08 |
| 2020/0011411 A1 | 1/2020 | Gilliland et al. |
| 2020/0263613 A1* | 8/2020 | Simon ................. F16H 57/0006 |
| 2020/0292059 A1* | 9/2020 | Tourniaire ............ F16H 57/043 |
| 2020/0332858 A1 | 10/2020 | Dombek |

* cited by examiner

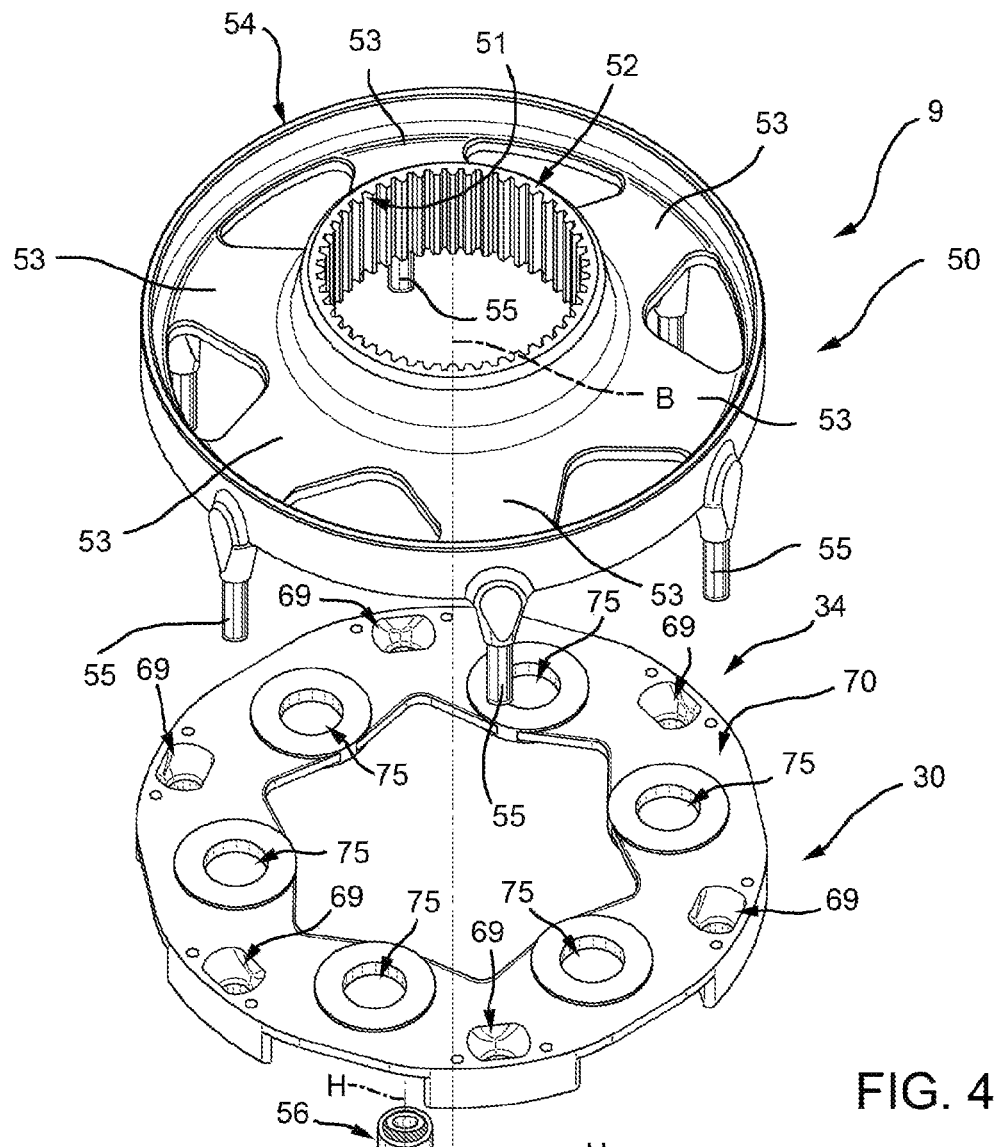
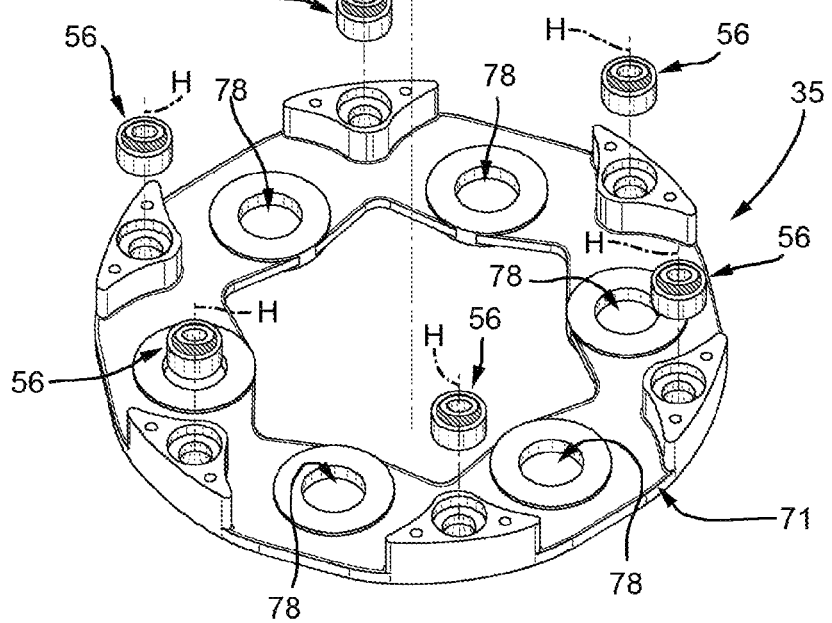
FIG. 4

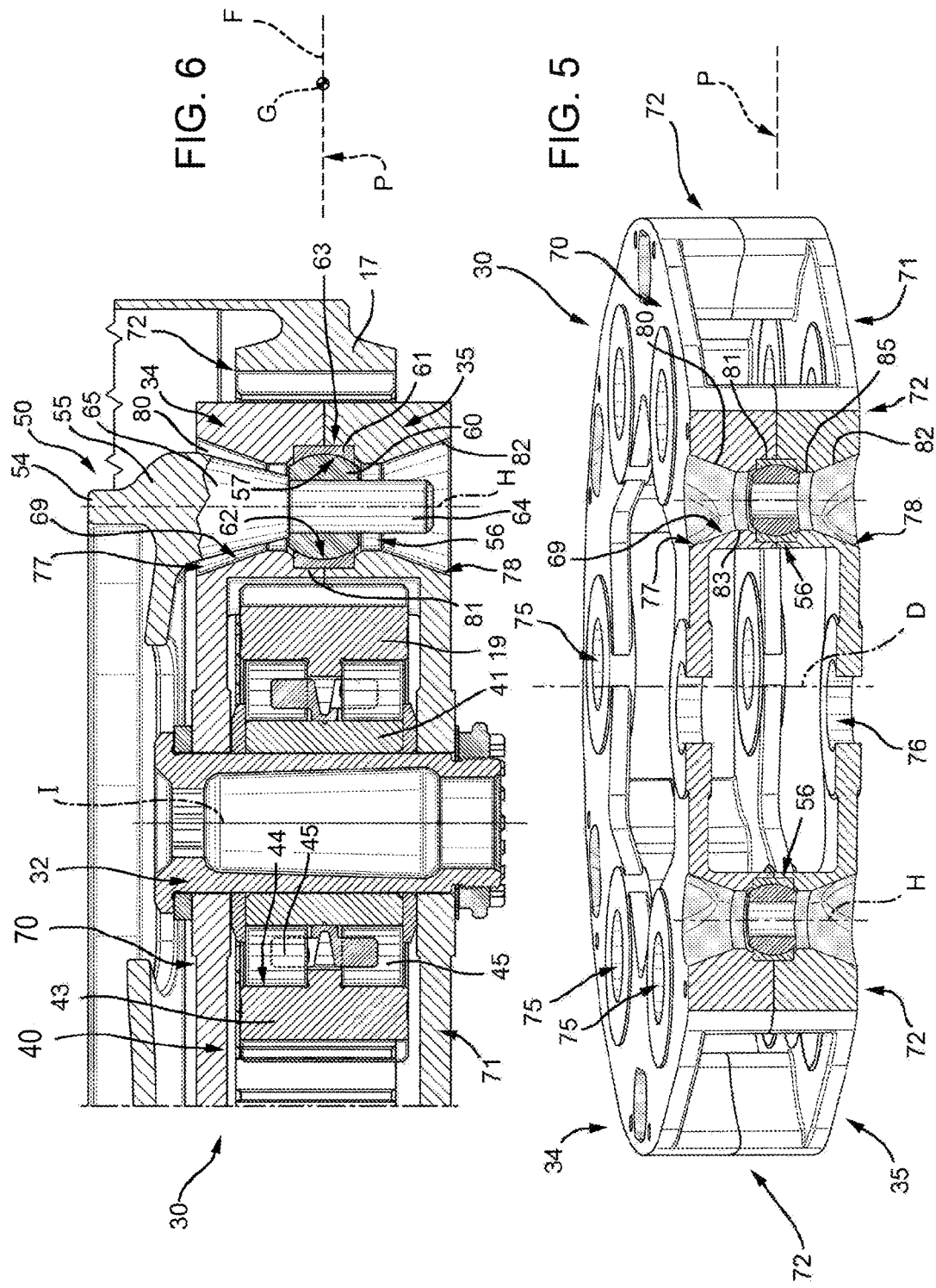

AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2022/051804, filed on Mar. 1, 2022, which claims priority from European Patent Application No. 21162130.5, filed on Mar. 11, 2021, all of which are incorporated by reference, as if expressly set forth in their respective entireties.

TECHNICAL FIELD

The present invention relates to an aircraft capable of hovering, for example a helicopter or a convertiplane or a heliplane.

BACKGROUND ART

As is known, helicopters are generally provided with transmissions adapted to transmit the motion from one or more turbines to the rotors, main and/or tail, and/or from the turbine to a plurality of accessory devices, i.e., responsible, for example, to supply the energy necessary for the operation of on-board equipment.

Helicopters generate the lift needed to sustenance by rotating the blades of the main rotor. As a result, helicopters can land/take off without the need for horizontal speed and using particularly small surfaces. Moreover, helicopters are able to hover and to fly at relatively low altitudes and speeds, making them particularly manoeuvrable and suitable for demanding manoeuvres such as rescuing people in the mountains or at sea.

Nevertheless, helicopters have inherent limitations in terms of maximum operational altitude, which is around 20000 feet, and maximum operational speed, which cannot exceed 150 knots.

In order to meet the demand for aircrafts capable of presenting the same manoeuvrability and comfort of use as the helicopter and at the same time overcoming the inherent limitations mentioned above, convertiplanes and heliplanes are known.

In greater detail, convertiplanes of the know type essentially comprise:
- a fuselage extending along a first longitudinal axis;
- a pair of half-wings stretching cantilevered from respective parts of the fuselage opposite one another, and having respective free ends opposite to the fuselage and aligned along a second transverse axis substantially orthogonal to the first longitudinal axis;
- a pair of nacelles carrying the respective motors and fixed with respect to the relative half-wings; and
- a pair of rotors rotatable around respective third axes and operatively connected to respective motors.

Each rotor comprises, in a known manner, a drive shaft rotatable around the relative third axis and a plurality of blades articulated on the drive shaft, in particular circumferentially distributed around the free end of the drive shaft that comes out from the respective nacelle.

The convertiplanes are also able to selectively assume:
- an "airplane" configuration in which the rotors are arranged with respective third axes substantially parallel to the first axis of the convertiplane; or
- a "helicopter" configuration, in which the rotors are arranged with the respective third axes substantially vertical and transverse to the first axis of the convertiplane.

Thanks to the possibility of tilting the rotors, the convertiplanes are able to take off and land like a helicopter, i.e. in a direction substantially perpendicular to the first longitudinal axis of the convertiplane, without the need for a runway.

In addition, the convertiplanes are also able to take off and land on rough terrain and without generating a noise level incompatible with an urban settlement.

In addition, the convertiplanes are capable of hovering when arranged in the helicopter configuration.

Furthermore, the convertiplanes can reach and maintain cruising speeds of approximately 250-300 knots and flight altitudes of the order of 30000 feet when arranged in the airplane configuration.

This cruising speed is well above the value of about 150 knots that defines the maximum cruising speed of helicopters.

Similarly, the above altitude is well above that typical of helicopters and allows convertiplanes arranged in an airplane configuration to avoid the clouds and atmospheric disturbances characteristic of lower altitudes.

The heliplanes, also known as "compound helicopters", such as, for example, the EUROCOPTER X-3 aircraft comprise, in addition to components commonly found in a known helicopter such as a main rotor with vertical axis, a pair of half-wings stretching cantilevered from respective parts of the fuselage of the heliplane along a fifth transverse axis substantially orthogonal to the longitudinal axis of the aircraft and to the axis of rotation of the main rotor.

In more detail, each of the half-wings carries a respective pushing propeller which comprises, in a known manner, a drive shaft operable by a relative motor and a plurality of blades articulated on the drive shaft.

In particular, each drive shaft is rotatable around a relative sixth axis substantially parallel to the longitudinal axis of the heliplane, i.e., a horizontal axis.

The heliplane is therefore able, in the same way as the convertiplane, to take off and land in a vertical direction by means of the main rotor and to fly in forward flight by means of the propellers and the aforesaid half-wings.

During the forward flight, the main rotor rotates idle while thrust is generated by the propellers.

Regardless of whether it is a helicopter, a convertiplane or a heliplane, these aircrafts comprise one or more mechanical transmissions adapted to transmit motion from one or more turbines to the rotors.

Such mechanical transmissions generally employ one or more planetary gears within the reduction chain, which is adapted to transmit power with an adequate torque value and number of revolutions to the actuation shaft of the main rotor.

In the simplest form, the aforesaid planetary gear essentially comprises:
- a first toothed defined as sun wheel, which is rotatable around a seventh fixed axis;
- a second fixed toothed wheel defined as crown wheel, which has an eighth axis coinciding with the fourth axis; and
- a plurality of toothed wheels, defined as satellites, which mesh with the sun and the crown and are rotatable around respective ninth movable axes.

The planetary gears also comprise a satellite carrier, which is rotatable around the seventh axis and is connected to the satellites.

More precisely, the satellites are rotatable around the respective ninth axes relative to respective pins of the satellite carrier and describe a motion of revolution around the seventh axis integral with the satellite carrier.

Relative rotation between satellites and pins of the satellite carrier is allowed by respective rolling bearings.

Each rolling bearing comprises, in turn:
- a first ring angularly integral with the respective pin and defining a first raceway;
- a second ring angularly integral with the respective said satellite and defining a second raceway; and
- a plurality of rolling bodies, preferably a double crown of cylindrical rollers, which roll on the first and second raceway.

The crowns of the same bearing are arranged on a respective side and symmetrically with respect to a plane of symmetry of the respective satellite orthogonal with respect to the relative ninth axis.

In a known embodiment, mechanical power enters the planetary gear via the sun and is transmitted to the satellite carrier.

The satellite carrier also has a power take-off connected to the rotor shaft in order to transmit to the latter the correct drive torque with the correct angular speed.

The satellite carrier necessarily has an asymmetrical shape with respect to a plane orthogonal to the seventh axis.

This is due to the fact that the power take-off connecting the drive shaft of the main rotor to the satellite carrier cannot be placed on the same plane of symmetry of the satellites that is orthogonal to the seventh axis, due to the presence of the sun and the crown in position respectively radially internal and external with respect to the satellites.

Because of such geometric asymmetry of the satellite carrier, the stiffness of the same is necessarily asymmetrical with respect to the aforesaid plane orthogonal to the seventh axis.

Under operating conditions, the sun transmits a considerable drive torque to the satellite carrier.

Due to the asymmetric stiffness of the satellite carrier, the transmission of the drive torque from the sun to the satellite carrier generates differential deformations in the radial direction on the cylindrical rollers of each satellite.

These differential deformations cause the inclination of the pins the axes of which no longer coincide perfectly with the seventh axes of rotation of the satellites with respect to the fifth axis of rotation of the sun, generating significant consequences on the proper operation of the planetary gear.

In fact, the cylindrical roller bearings and the toothed wheel operate with high contact pressures and their operation is optimal when the aforesaid seventh, eighth and ninth axis are perfectly aligned with each other.

More precisely, in case of perfect alignment of the aforesaid seventh, eighth and ninth axis, the course of the contact pressure between the cylindrical rollers with respect to an axial coordinate of the cylindrical roller has a substantially flat course with a decrease at the axial ends.

On the contrary, in case of misalignment between the respective seventh, eighth and ninth axis, the aforesaid course of the contact pressure shows higher values of much more variable course than the condition of perfect alignment. A similar phenomenon is generated at the teeth of the satellites meshing with the sun and the crown. This causes a reduction in the operating life and operating performance of the planetary gear.

It is felt in the sector the need to contain the deformation under load of the satellite holder, in order to increase the life and the operating performance of the planetary gear.

US 2020/0292059 describes a planetary gear with a plurality of satellites carried by a planetary carrier. The planetary carrier comprises a support and a plurality of pins carried by the support. Each pin has a connecting segment arranged on the opposite side of the support. Each satellite is arranged around a respective connecting segment and has a degree of rotational freedom with respect to the connecting segment. A retaining element is carried by the pins and connects them. Each satellite is arranged in an area arranged between the support and the retaining element. Each pin can move in a limited manner with respect to the retaining element.

US 2020/0332858 describes a planetary gear comprising a sun, and a plurality of satellites housed in a cage that supports the bearings of the satellites and the lubrication system of the sun.

The cage comprises, in turn:
- a plurality of receiving elements engaged by axial arms fixed to a body;
- a finger passing radially through a relative receiving element and adapted to guide a joint carried by one of the arms into rotation; and
- lubrication means carried by one of the fingers to lubricate the joint.

US 2009/0111639 describes a planetary gear, wherein each satellite is supported on the relative pin through a combination of a radially inner spherical support and a radially outer cylindrical roller bearing. The spherical support allows the oscillation of the cylindrical roller bearing, so as to compensate for any angular misalignment between the satellite and the relative pin of the planetary carrier and to allow its relative rotation.

US 2020/0011411 describes a planetary gear provided, for each satellite, with a spherical support and a cylindrical roller bearing. The spherical support allows the oscillation of the cylindrical roller bearing, so as to compensate for any angular misalignment between the satellite and the relative pin of the planetary carrier and to allow its relative rotation.

The planetary gear further comprises, for each satellite, an element, which comprises, in turn, a surface radially defining a radially inner raceway for the cylindrical rollers and a radially inner surface associated with the outer surface of the spherical element.

U.S. Pat. No. 5,466,198 discloses a geared drive system employing a planetary gear train conveys torque and rotary motion from a source thereof to a bladed propulsor or other device requiring torque and rotary motion. A pivotable joint arrangement connects the planet carrier to a rotating or static torque frame in a manner that isolates the carrier from torsional deflections and the deleterious effects thereof.

DISCLOSURE OF INVENTION

Aim of the present invention is to realize an aircraft, which allows to satisfy, in a simple and economic way, the above-mentioned requirement.

The aforesaid aim is achieved by an aircraft capable of hovering as claimed in claim 1.

BRIEF DESCRIPTION OF THE DRAWINGS

Further features and advantages of the present invention will become apparent from the detailed description that follows, provided by way of non-limiting example and with reference to the accompanying drawings, wherein:

FIG. 4 is an exploded view of a satellite carrier of the main reduction stage of FIGS. 2 and 3, with parts removed for clarity's sake;

FIG. 5 is a perspective view of the satellite carrier of the reduction stage of FIGS. 2 to 4, with parts removed for clarity's sake;

FIG. 6 is a cross section on an enlarged scale of some components of the planetary gear of the transmission of FIGS. 2 to 5;

BEST MODE FOR CARRYING OUT THE INVENTION

Figure 1:
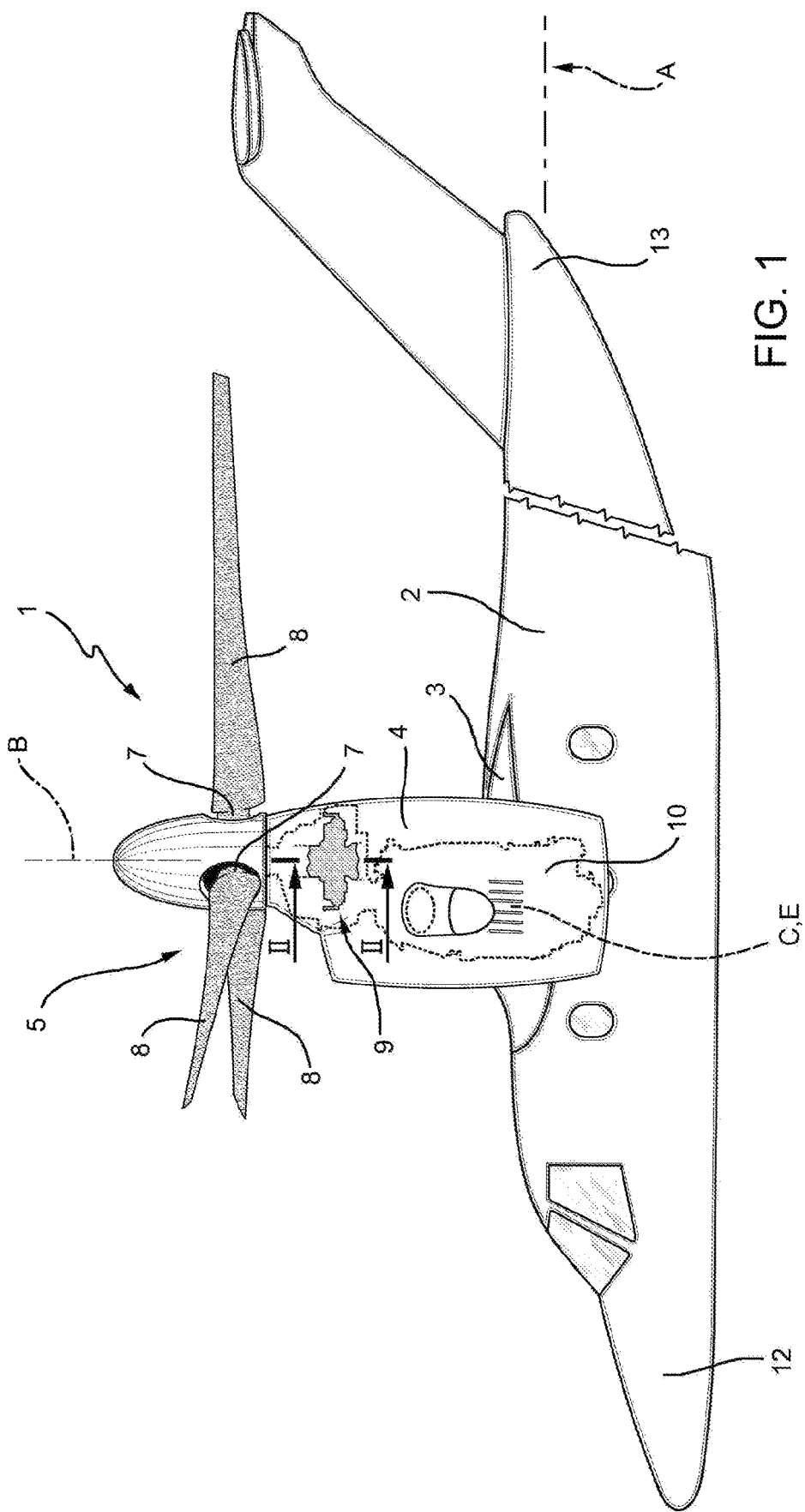
FIG. 1 shows a side view of an aircraft capable of hovering, in particular a convertiplane, realized according to the present invention.

With reference to FIG. 1, number 1 denotes an aircraft capable of hovering, in the shown case a convertiplane.

The convertiplane 1 essentially comprises:
a fuselage 2 having an axis A of longitudinal extension;
a pair of half-wings 3 extending cantilevered manner from respective parts opposite one another of the fuselage 2 and transversely to the axis A;
a pair of nacelles 4 housing relative motors 10 and fixed with respect to the corresponding half-wings 3; and
a pair of rotors 5 operatively connected with respective motors.

The fuselage 2 also comprises a nose 12 arranged at the front and a tail portion 13 that are opposite one another along the axis A.

Each half-wing 3 comprises a free end and opposite to the fuselage 2. The ends of respective half-wings 3 are aligned along an axis E orthogonal to the axis A.

It should be noted that the term "front", "of tail", "longitudinal", "lateral", "above" and "below" and the like used in this description refer to a normal direction of advancement of the convertiplane 1.

By way of a non-limiting example, the aforesaid motor 10 may be a multistage turbine motor of the turboshaft type, or an internal combustion motor, or a hybrid (electric-thermal) powertrain.

In greater detail, each rotor 5 essentially comprises:
a drive shaft 11 rotatable around an axis B;
a hub 7 driven in rotation by the drive shaft 11; and
a plurality of blades 8 articulated on the hub 7.

The rotors 5 are tiltable around an axis C relative to the relative half-wings 3 and the relative nacelles 4.

The axis C is transverse to the axis A and to the axes B. The axis C is also parallel to the axis E.

The convertiplane 1 can be selectively arranged:
in a "helicopter" configuration (visible in FIG. 1), wherein the axes B of the rotors 5 are orthogonal to the axis A and to the axis C; and in an "airplane" configuration (not shown), wherein the axes B of the rotors 5 are parallel to the axis A and orthogonal to the axis C.

The convertiplane 1 further comprises, for each rotor 5, a main transmission 9 adapted to transmit motion from one or more motors 10 to the drive shaft 11 (only schematically shown in FIG. 1) of the relative rotor 5.

Since the transmissions 9 are identical to each other, reference will be made in the following to a single rotor 5 and to the relative transmission 9.

Figure 3:
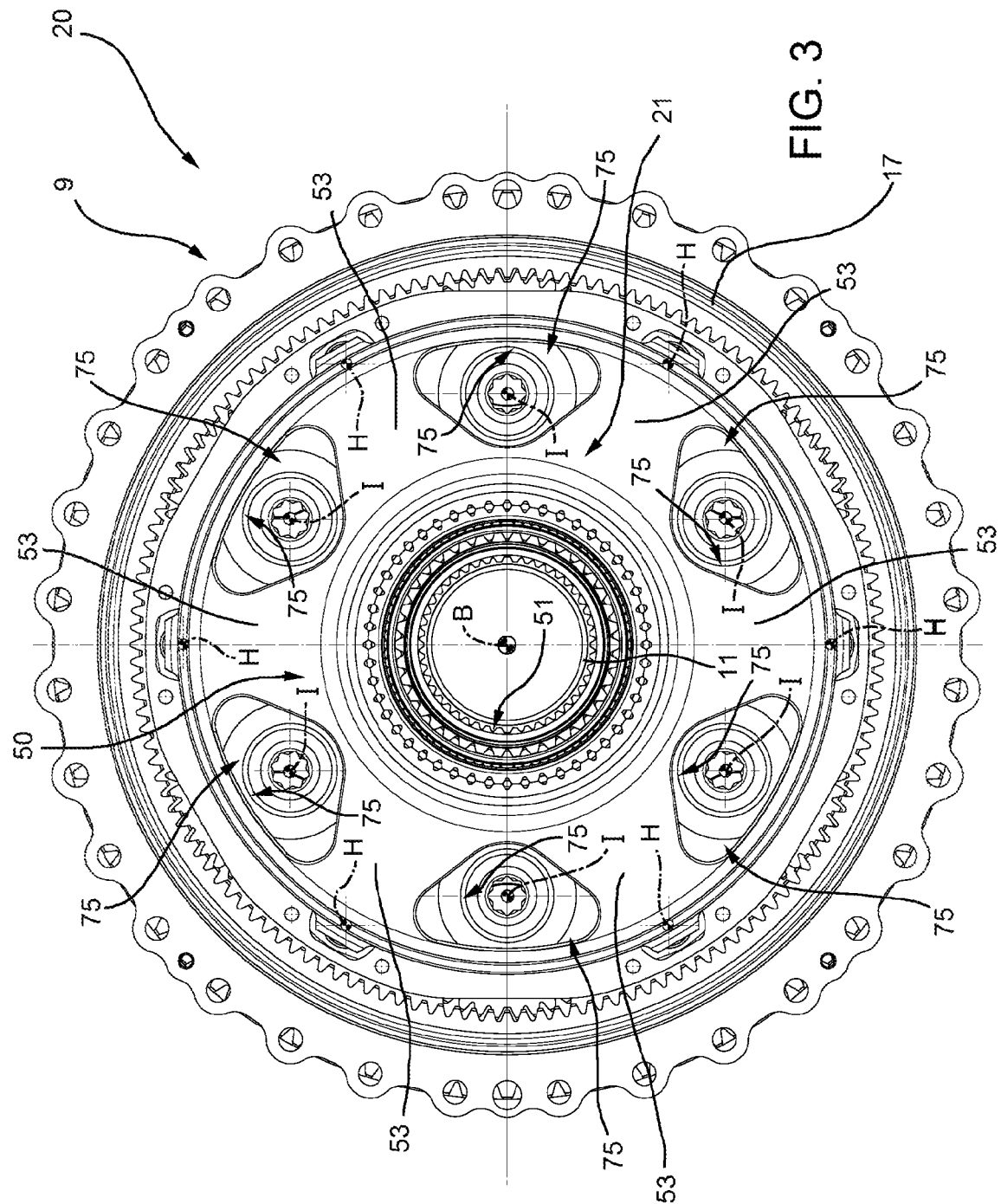
FIG. 3 is a top view of the planetary reduction stage of FIG. 2.
Figure 7:
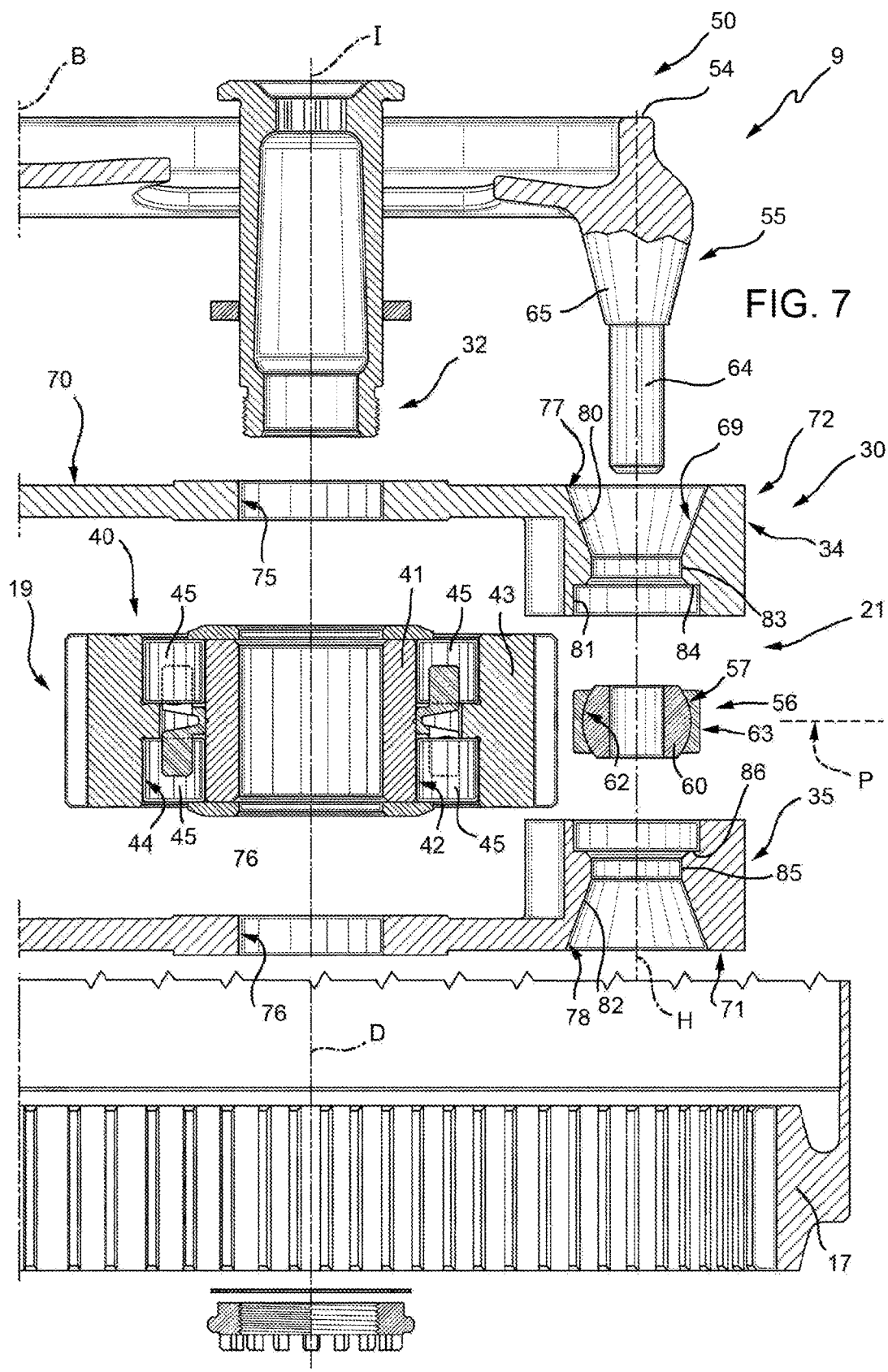
FIG. 7 is an exploded view of some components of the transmission of FIGS. 2 to 6.

The transmission 9 further comprises an end stage 20 essentially formed by a planetary gear 21 (FIG. 3), which transmits power to the drive shaft 11 of the rotor 5 with the correct torque and angular speed values.

In the shown case, the planetary gear 21 is a gearbox.

Figure 2:
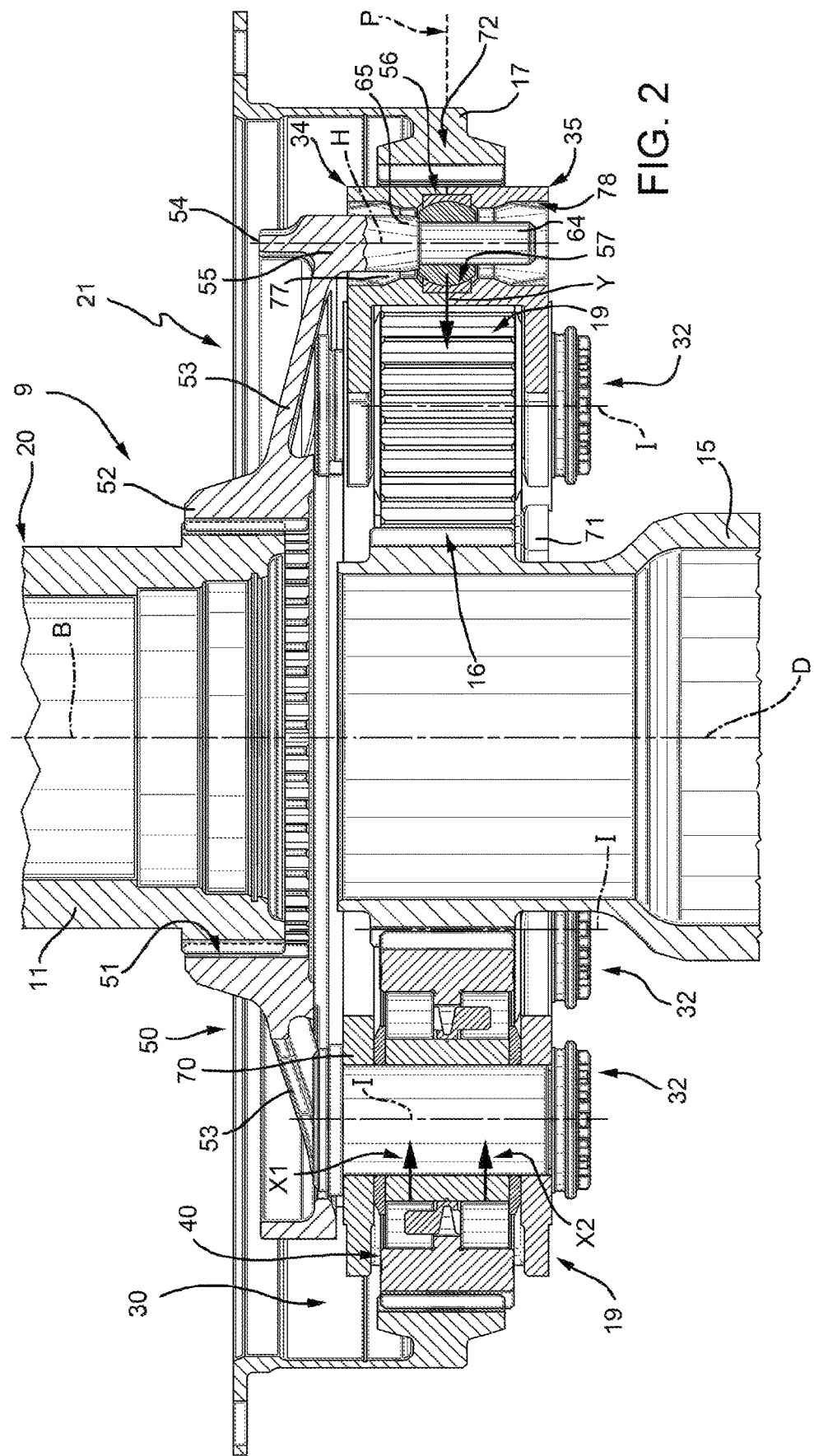
FIG. 2 is a longitudinal section along line II-II of FIG. 1 of a planetary reduction stage of a transmission of the aircraft of FIG. 1.

With particular reference to FIG. 2, the planetary gear 21 essentially comprises:
a sun 15 comprising a plurality of teeth 16, rotatable around an axis D and operatively connected to an input shaft (not shown) of the stage 20;
a crown 17 angularly fixed with respect to the axis D; and
a plurality of toothed wheels performing the function of respective satellites 19 rotatable around respective axes I parallel to the axis D and meshing with the sun 15 and the crown 17.

In the shown case, the crown 17 has a larger diameter than the sun 15.

The crown 17 surrounds the satellite carrier 30.

The crown 17 is, moreover, carried by a fixed structure only partially shown in the attached Figures.

The planetary gear 21 further comprises a satellite carrier 30 (shown schematically in FIG. 3) rotatable around the axis D, directly connected to the drive shaft 11 of the rotor 5, and connected to the satellites 19.

In particular, each satellite 19 rotates around its axis I with respect to the satellite carrier 30 and describes a motion of revolution around the axis D integrally with the satellite carrier 30.

Moreover, the mechanical power enters the planetary gear 21 at the sun 15 and exits therefrom, in the direction of the drive shaft 11 of the rotor 5, at the satellite carrier 30, with the correct torque value and number of revolutions.

In particular, the satellite carrier 30 comprises, in turn (FIGS. 2, 3, 6 and 7):
a plurality of pins 32 extending along respective axes I and on which respective satellites 19 are rotatably mounted around the respective axes I; and
a plurality of rolling bearings 40 radially interposed between respective pins 32 and satellites 19.

In greater detail, each bearing 40 is adapted to support a respective satellite 19 rotatably around a respective axis I on a respective pin 32.

Each bearing 40 comprises, in turn:
a ring 41 angularly fixed with respect to the relative pin 32 and defining a raceway 42;
a ring 43 angularly fixed with respect to the relative satellite 19, arranged radially outermost of the ring 41 with respect to the relative axis I, and defining a raceway 44 facing the relative raceway 42; and
a plurality of rolling bodies 45 rolling on the relative raceways 42, 44.

In the case shown in FIG. 2, the bodies 45 of each bearing 40 are cylindrical rollers coaxial to the relative axis I, and forming two rows arranged around the relative axis I and spaced apart parallel to the relative axis I.

The satellites 19 have a plane of symmetry P orthogonal to the respective axes I.

Each crown of rolling bodies 45 is arranged on a respective side of said plane of symmetry P.

Furthermore, the transmission 9 comprises an interface 50 interposed between the satellite carrier 30 and the drive shaft 11, rotatable integral with the satellite carrier 30 around the axis D and integral with the drive shaft 11 around the axis B; the interface 50 being coupled to the satellite carrier 30 and to the drive shaft 11 so as to allow at least a portion of the interface 50 to be tilted with respect to the satellite carrier 30.

In greater detail, the interface 50 is articulated on the satellite carrier 30 so as to be, at least in part, tiltable with respect to the satellite carrier 30 around a pair of axes F, G (FIG. 6) that are orthogonal to each other and orthogonal to the axes I.

In other words, the coupling between satellite carrier 30 and interface 50 is torsionally rigid with reference to the axes D, B, but allows the deflection of the aforesaid portion of the interface 50 with respect to the satellite carrier 30 around the axes F, G.

In this way, the torque transmitted from the sun 15 to the satellites 30 does not result in a misalignment of the axes I with respect to the axis D and to the axis B, but in the elastic deformation of the interface 50.

Figure 8:
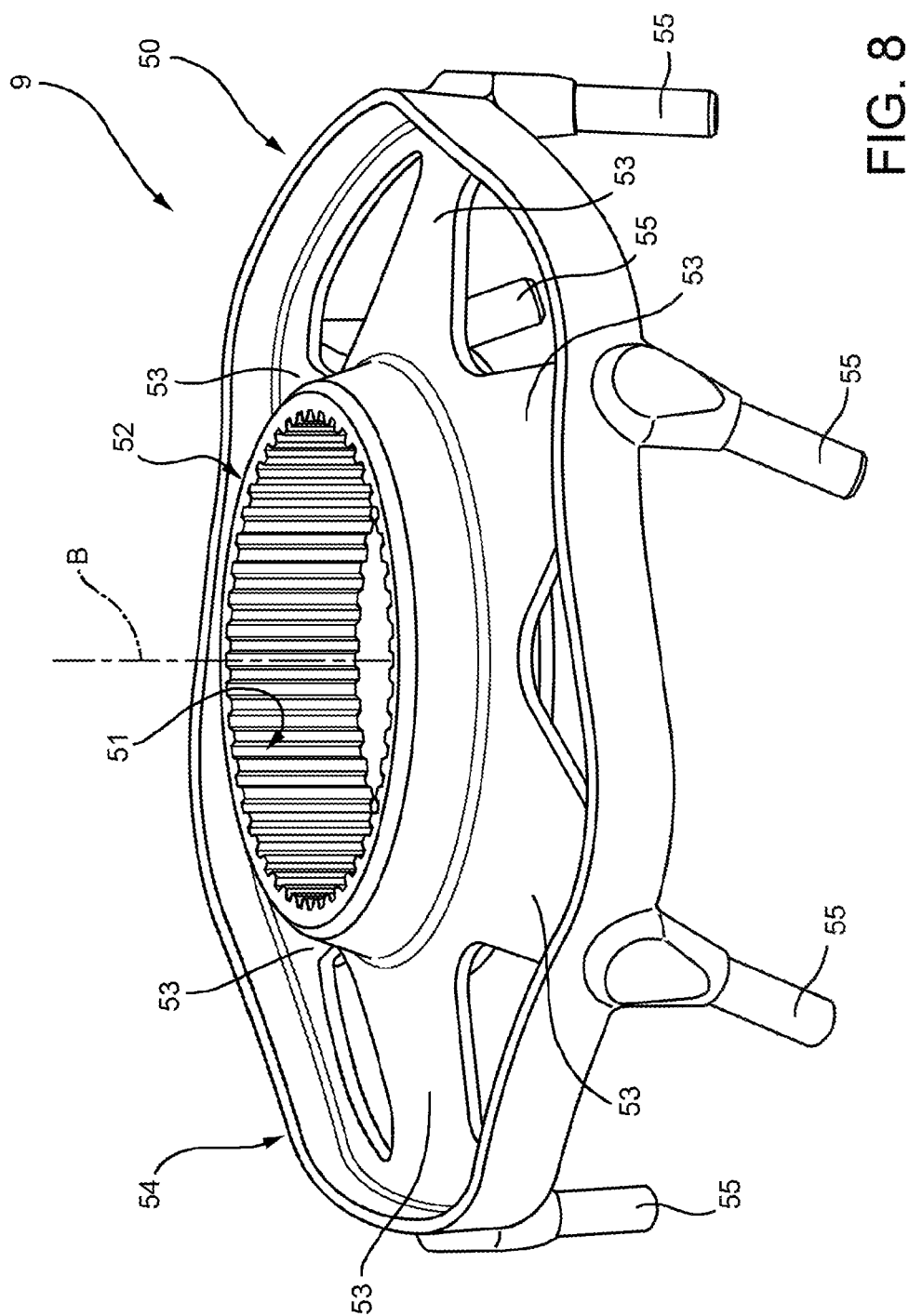
FIG. 8 is a schematic view of the elastic deformation of an interface of the transmission of FIGS. 2 to 7.

More particularly, the interface 50 exhibits an asymmetric deformation with respect to the same plane P when subjected to the torque transmitted by the satellite carrier 30, as shown in FIG. 8.

This is due to the fact that the interface 50 is geometrically asymmetric with respect to the plane P and is constrained to the shaft 11.

In contrast, the satellite carrier 30 exhibits a symmetrical deformation with respect to its median plane P orthogonal to the axis D.

Advantageously, the interface 50 further comprises:
a radially inner end edge 52 defining a radially inner seat 51 internally with an engagement of which the shaft 11 is keyed;
a radially outer edge 54; and
a plurality of spokes 53 angularly equally spaced from each other, extending radially between the edges 52, 54. In particular, the spokes 53 are divergent from each other towards the satellite carrier 30, proceeding from the edge 52 towards the edge 54.

The interface 50 further comprises:
a plurality of pins 55 elongated parallel to respective axes H; and
a plurality of ball joints 56 rotatable integrally to respective pins 55 around respective axes H and articulated on the satellite carrier 30, so as to allow the inclination of the pins 55 with respect to the satellite carrier 30 around the axes F, G.

In greater detail, each pin 55 comprises:
a cylindrical end section 64 axially opposite to the respective rib 53; and
a section 65 interposed between the respective rib 53 and the section 64, and tapered from the respective rib 53 to the section 64.

Each ball joint 56 comprises, in turn:
an element 60 crossed by the relative pin 55, angularly fixed to the relative pin 55 with reference to the relative axis H, and defining on the opposite side of the pin 55 a partially spherical surface 57; and
an element 61 comprising a partially spherical surface 62 coupled to the surface 57 of the element 60, and a surface 63 that is cylindrical and radially external with respect to the surface 57.

The elements 60, 61 extend symmetrically with respect to the plane P.

The pins 55 are axially fixedly constrained relative to the respective ball joints 56 with reference to the respective axes H, for example by means of respective nuts.

The pins 55 represent the portion of the interface 50 that is tiltable with respect to the satellite carrier 30 during the torque transmission from the sun 15 to the shaft 11.

The satellite carrier 30 has an annular conformation with respect to the axis B and symmetrical with respect to the plane P.

In greater detail, the satellite carrier 30 comprises:
a pair of head plates 70, 71 lying in respective planes parallel to each other and orthogonal to the axis D; and
a plurality of crossbars 72 angularly equally spaced around the axis D, and extending orthogonally to and between the plates 70, 71.

The plates 70, 71 are respectively arranged on the side of the shaft 11 and on the side axially opposite to the shaft 11.

The plates 70, 71 define, moreover, respective polygonal seats 73, 74 of axis D, axially superimposed each other and crossing with radial clearance from sun 15.

The plates 70, 71 further define respective pluralities of holes 75, 76, six for each plate 70, 71 in the shown case, angularly spaced, and axially superimposed and spaced apart between them.

Each pair of holes 75, 76 is crossed by a respective pin 32.

The crossbars 72 define respective seats 69 housing respective pins 55 and corresponding ball joints 56.

Each seat 69 extending (FIG. 7) parallel to the relative axis H comprises respective open ends 77, 78 axially opposite one another and defined by the plates 70, 71, respectively.

Each seat 69 comprises, proceeding from the respective end 77 towards the respective end 78:
a truncated cone-shaped section 80;
a cylindrical section 81; and
a truncated cone-shaped section 82.

The sections 80, 82 of each seat 69 are crossed with radial clearance by a respective pin 55.

More specifically, the section 80 of each seat 69 is crossed with radial clearance by the section 65 of the respective pin 55.

The section 82 of each seat 69 is crossed with radial clearance by an end portion of the section 64 of the respective pin 55.

The element 61 of each ball joint 56 is fixed to the section 81 of a relative seat 69.

The section 80 is tapered from the end 77 towards the section 81.

The section 82 is tapered from the end 78 towards the section 81.

Each seat 69 further comprises, proceeding axially from the section 80 towards the section 81:
a cylindrical section 83; and
a truncated cone-shaped section 84 axially interposed between the section 83 and the section 81.

Each seat 69 further comprises, proceeding axially from the section 82 to the section 81:
a cylindrical section 85; and
a truncated cone-shaped section 86 axially interposed between the section 85 and the section 81.

Each section 83, 85 has a diameter corresponding to the smaller diameter of the respective section 80, 81.

Each section 84, 86 has a smaller diameter corresponding to the diameter of the respective section 80, 81.

The section 81 has a larger diameter than the smaller diameter of the sections 84, 86.

The seats 69 are radially external with respect to the holes 75, 76.

Each seat 69 is angularly interposed between two pairs of holes 75, 76 angularly consecutive between them.

The crossbars 72 are six in number in the shown case.

The satellites 19 are angularly interposed between two seats 69 consecutive between them.

Preferably, the satellite carrier 30 is formed by two axially superimposed elements 34, 35.

The elements 34, 35 are identical to each other.

With reference to FIG. 5, each element 34 (35) comprises:
the plate 70 (71);
the sections 80, 83, 84 (82, 85, 86) of the respective crossbar 72; and
a respective half of the section 81 of the respective crossbars 72.

The planetary gear 21 further comprises a rolling bearing 90 radially interposed between sun 15 and interface 50 (FIG. 2).

The operation of the convertiplane 1 is described limited to a single rotor 5 and to the relative transmission 9.

In greater detail, the transmission 9 transmits motion from the motor 10 to the shaft 11 of the rotor 5.

The power enters the planetary gear 21 through the sun 15, which rotates around the axis D and exits through the satellite carrier 30 connected to the aforesaid shaft 11 of the rotor 5.

Thanks to the fact that the satellites 19 also mesh with the fixed crown 17, the rotation of the sun 15 causes the rotation of the satellites 19 around their axes I and the revolution of the satellites 19 around the axis D.

More precisely, the satellites 19 rotate around the relative axis I with respect to the corresponding pins 32 thanks to the rolling bearings 40. In particular, the cylindrical rollers 45 allow the rotation of the satellites 19 with respect to the pins 32 around the relative axes I.

Moreover, the satellites 19 describe the motion of revolution around the axis D integrally with the satellite carrier 30.

The rotation of the satellite carrier 30 transmits power with the appropriate number of revolutions to the shaft 11 of the rotor 5, via the interface 50.

In particular, the satellite carrier 30 and the interface 50 are rotationally integral with respect to the axes D, B so as to transmit the torque from the sun 15 to the interface 50.

Otherwise, the ball joints 56 allow the pins 55 of the interface 50 to be tilted with respect to the satellite carrier 30 around the axes F, G orthogonal to the axes D, B.

This is because, the surfaces 62 of the elements 60 fixed to the interface 50 may rotate on the corresponding surfaces 63 of the elements 61 fixed to the satellite carrier 30.

In other words, the ball joints 56 couple the pins 55 of the interface 50 and the satellite carrier 30 in a torsionally rigid manner with respect to the axis B, D and flexibly yielding with respect to the axes F, G.

Consequently, the power transmitted by the sun 15 results in a symmetrical deformation of the satellite carrier 30 with respect to the plane P and in an asymmetrical deformation of the interface 50 shown in FIG. 8.

In greater detail, the rolling bodies 45 of each bearing 40 of each satellite 19 are subjected (FIG. 2):
a pair of active forces X1, X2 tangential to the relative axis I transmitted by the ring 43 following the meshing between sun 15 and respective satellite 19;
a reactive force Y tangential to the axis I of the relative ball joint 56 transmitted by the ring 41 following the coupling between planetary carrier 30 and interface 55 via the ball joints 56.

These active forces X1, X2 and reactive forces Y are symmetrical with respect to the plane P, since the rolling bodies 45 and the elements 60, 61 are arranged symmetrically with respect to the plane P.

Since the planetary carrier 30 is symmetrical with respect to the plane P, it has symmetrical stiffness with respect to the plane P.

Consequently, the active forces X1, X2 and reactive forces Y, preferably all equal in modulus, symmetrical with respect to the plane P generate the same elastic deformations and displacements on the rolling bodies 45 arranged on both sides of the plane P.

The axes D, I thus remain parallel to each other.

From an examination of the convertiplane 1 according to the present invention, the advantages that it allows obtaining are evident.

In particular, the interface 50 is coupled to the satellite carriers 30 and to the shaft 11 so as to allow the angular misalignment of the axes H of the pins 55 with respect to the axis B of the satellite carrier 30.

In this way, the torque transmitted from the sun 15 to the satellite carrier 30 results in the integral rotation of the satellite carrier 30 and of the interface 50 around the axis B, and the deflection of the pins 55 with respect to the satellite carrier 30 and around the axes F, G.

Consequently, the axes I, D of the rolling bodies 45 of the bearings 40, of the satellites 19 and of the sun 15 remain perfectly parallel to each other, during the actuation of the motor 10.

The course of the contact pressure on the rolling bodies 45 as a function of an axial coordinate of the same rolling bodies 45 has, therefore, a substantially flat course with a decrease at the axial ends, and presents representative values significantly lower than those found in the solutions of known type and described in the introductory part of the present description with reference to an inclination between the axes I and the axis D.

This results in a substantial increase in the duration and operating performance of the planetary gear 21.

The satellite carrier 30 is symmetrical with respect to the plane P.

Furthermore, the elements 60, 61 are arranged symmetrically with respect to the plane P.

Therefore, under conditions of torque transmission from the sun 15 to the satellite carrier 30, the rolling bodies 45 are subjected to the active tangential forces X1, X2 from the sun 15 transmitted by the rings 43 and to the reactive tangential forces Y from the ball joints 56 transmitted by the rings 41 which forces are symmetrical with respect to the plane P (FIG. 2).

Since the stiffness of the aforesaid satellite carrier 30 is symmetrical with respect to the plane P, said active forces X1, X2 and reactive forces Y are tangential to the respective axes I and cause, therefore, deformations, forces and elastic displacements of the rolling bodies 45 that are substantially identical.

This helps to keep the axes I, D of the rolling bodies 45 of the bearings 40, of the satellites 19 and of the sun 15 perfectly parallel to each other, during the actuation of the motor 10, with the achievement of the advantages indicated above.

The continuous circumferential edge 54 of the interface 50 elevates the stiffness of the interface 50, limiting the elastic deformation thereof, and the flexion of the axes H as a result of the torque transmission from the motor 10 and through the satellite carrier 30.

The spokes 53 help to make the elastic deformation of the interface 50 as little asymmetrical as possible.

Finally, it is clear that modifications and variations can be made to the convertiplane 1 previously described without thereby departing from the scope of protection of the present invention.

Furthermore, the crown 17 of the planetary gear 21 may be rotatable around the axis D with a different angular speed than that of the sun 15.

Furthermore, the mechanical power could enter the planetary gear 21 at the satellite carrier 30 and exit it, at the sun 15 with the correct torque value and number of revolutions.

Further, the transmission 9 may comprise two or more planetary gears 21 in series or in parallel with each other.

Further, the transmission 9 may be at least partially integrated into one of the turbines of the motor 10.

Finally, the transmission 9 and the planetary gear 21 could be used in a helicopter or in a heliplane or in an aircraft capable of remote-piloted hovering commonly referred to as a UAV.

The invention claimed is:

1. Aircraft capable of hovering, comprising:
   at least one motor member;
   at least one rotor operatively connected to said motor member;
   at least one transmission shaft rotatable around a first axis and adapted to drive said rotor; and
   at least one transmission interposed between said motor member and said rotor;
   said transmission comprising a planetary gear formed by:
      a sun rotatable around a second axis with a first angular speed;
      a crown angularly fixed with respect to said second axis or rotatable around said second axis with a second angular speed different from said first angular speed;
      at least two satellites meshing, each, with said crown and said sun, and being rotatable around respective third axes, which are in turn rotatable around said second axis; and
      a satellite carrier rotatable around said second axis and comprising at least two first pins with respect to which said satellites are rotatable around said respective third axes;
   wherein said transmission comprises:
      an interface interposed between said satellite carrier and said transmission shaft, coupled to said satellite carrier around said second axis and said transmission shaft around said first axis;
   said interface being coupled to said satellite carriers and to said transmission shaft so as to allow an angular misalignment between a portion of said interface and said second axis;
   said interface being articulated on said satellite carrier, so that said portion is tiltable with respect to said satellite carrier around at least a fourth axis orthogonal to said first and second axes;
   said portion comprising a plurality of second elongated pins that are parallel to respective fifth axes; and in that it comprises a plurality of ball joints coupled to respective said second pins around said first axis and articulated on said satellite carrier, so as to allow said inclination of said interface with respect to said satellite carrier around said at least one fourth axis;
   said interface comprising an annular body, coupled in a rotationally integral manner with said transmission shaft and from which said second pins project axially in a cantilevered manner;
   wherein said annular body comprises a plurality of angularly equally spaced spokes;
   each second pin projecting axially cantilevered from a relative said spoke;
   said annular body comprising:
      a first circumferential, continuous and radially internal, end edge; and
      a second circumferential, continuous and radially external, end edge, said second circumferential end edge being axially superimposed on said second pins;
   said spokes extending radially between said first and second circumferential end edges.

2. Aircraft according to claim 1, wherein each ball joint comprises:
   a first element defining a first spherical surface and fixed to the respective second pin; and
   a second element defining a second spherical surface arranged in contact with the relative first spherical surface and fixed to said satellite carrier.

3. Aircraft according to claim 1, wherein said satellite carrier defines:
   a plurality of first seats angularly equally spaced and housing respective said first pins; and
   a plurality of second seats angularly equally spaced and housing respective said second pins.

4. Aircraft according to claim 3, wherein said second seats are radially external with respect to said first seats.

5. Aircraft according to claim 3, wherein each said second seat is circumferentially interposed between two said first seats circumferentially consecutive between them.

6. Aircraft according to claim 1, wherein said satellite carrier comprises a pair of half-elements axially superimposed on each other parallel to said second axis, defining respective axial end portions of said first seats, and defining a plurality of said second seats receiving respective said ball joints.

7. Aircraft according to claim 1, further comprising a plurality of rolling bearings interposed, each, between a respective first pin and respective ones of said at least two satellites;
   said bearing each comprising, in turn:
      a first ring coupled to said first pin and defining a first raceway;
      a second ring coupled to the respective said satellite and defining a second raceway; and
      a plurality of rolling bodies shaped as cylindrical rollers, radially interposed between said first and second ring, and rolling, in use, on said first and second raceway.

8. Aircraft according to claim 7, wherein said satellites have a plane of symmetry orthogonal to the respective said third axis;
   said rolling bodies of each said rolling bearing being arranged symmetrically with respect to said plane of symmetry;
   said satellite carrier being symmetrical with respect to the said plane of symmetry.

9. Aircraft according to claim 1, wherein said first and second element extend symmetrically with respect to a plane of symmetry.

10. Aircraft according to claim 1, wherein said aircraft is a convertiplane or a helicopter or a heliplane;

said convertiplane comprising, in turn, a pair of said motor members, a pair of said rotors and a pair of said transmissions each interposed between a respective motor member and a respective rotor.

11. Aircraft according to claim 1, wherein the first axis and the second axis are coextensive with each other.

\* \* \* \* \*